US012139852B2

(12) United States Patent
Ide (10) Patent No.: US 12,139,852 B2
(45) Date of Patent: Nov. 12, 2024

(54) WET PULP MATERIAL PROCESSING MACHINE

(71) Applicant: TAIZEN CO., LTD., Fuji (JP)

(72) Inventor: Takefumi Ide, Fuji (JP)

(73) Assignee: TAIZEN CO., LTD., Fuji (JP)

( * ) Notice: Subject to any disclaimer, the term of this patent is extended or adjusted under 35 U.S.C. 154(b) by 218 days.

(21) Appl. No.: 17/796,857

(22) PCT Filed: Feb. 14, 2020

(86) PCT No.: PCT/JP2020/005708
§ 371 (c)(1),
(2) Date: Aug. 1, 2022

(87) PCT Pub. No.: WO2021/161494
PCT Pub. Date: Aug. 19, 2021

(65) Prior Publication Data
US 2023/0068151 A1  Mar. 2, 2023

(51) Int. Cl.
*D21C 5/02* (2006.01)
*D21B 1/32* (2006.01)
*D21B 1/34* (2006.01)

(52) U.S. Cl.
CPC .............. *D21C 5/025* (2013.01); *D21B 1/32* (2013.01); *D21B 1/34* (2013.01); *D21C 5/02* (2013.01)

(58) Field of Classification Search
CPC . D21C 5/025; D21B 1/08; D21B 1/32; D21B 1/345; D21B 1/347; Y02W 30/64
See application file for complete search history.

(56) References Cited

U.S. PATENT DOCUMENTS 4,215,447 A   8/1980  Gartland
4,356,085 A   10/1982 Schon et al.
(Continued)

FOREIGN PATENT DOCUMENTS

JP   5488302 A    7/1979
JP   56133009 A   10/1981
(Continued)

OTHER PUBLICATIONS

PCT nternational Search Report, mailed Apr. 21, 2020, in counterpart PCT application PCT/JP2020/005708, 2 pages in Japanese and 2 pages in English.

*Primary Examiner* — Anthony Calandra
(74) *Attorney, Agent, or Firm* — Juan Carlos A. Marquez; Marquez IP Law Office, PLLC (57) ABSTRACT

In vertical concentrating washing machines, processed raw material is transported upward but ends up containing shower water. That is, the moisture content ends up increasing during the transport process even though the material has been dewatered. A transport blade (8) has a plate-like shape in plan view and includes a fan-shaped portion (10) that extends rearward in the rotational direction, developing into a fan shape, and the transport blade is attached such that a plate surface thereof has a slanted orientation with respect to the axis direction of a rotary shaft (6), with a forward side, in the rotational direction, of the plate surface being disposed lower than a rearward side thereof. A plurality of the transport blades (8) is attached so as to delineate a helix along the circumferential direction of the rotary shaft (6) while leaving a communicating portion that is straight in the vertical direction. Shower water falls from gaps (S) between the transport blade (8). The transport blades (8) have a fan shape that widens toward the inner wall side of the rotary drum (5). A surface area on which the material rests stably (Continued)

and a sufficient gap (S) are secured in a well-balanced fashion.

6 Claims, 7 Drawing Sheets

(56) References Cited

U.S. PATENT DOCUMENTS

| | | | | |
|---|---|---|---|---|
| 5,110,461 | A * | 5/1992 | Abel | B30B 9/121 |
| | | | | 210/174 |
| 2011/0174698 | A1* | 7/2011 | Bergstrom | D21D 5/16 |
| | | | | 209/250 |
| 2017/0218567 | A1* | 8/2017 | Kajanto | D21H 11/18 |

FOREIGN PATENT DOCUMENTS

| | | | | | |
|---|---|---|---|---|---|
| JP | 62299593 | A | | 12/1987 | |
| JP | 0673681 | A | | 3/1994 | |
| JP | 3410668 | B2 | | 5/2003 | |
| JP | 2020007669 | A | | 1/2020 | |
| JP | 2020051009 | A | | 4/2020 | |
| WO | WO-2005045128 | A1 | * | 5/2005 | D21D 5/026 |

* cited by examiner

(Top diagram)

(Side diagram)

FIG. 8

(Top diagram)  (Side diagram)

FIG.9

(Top diagram)  (Side diagram)

WET PULP MATERIAL PROCESSING MACHINE

This application is a national stage application filed under 35 U.S.C. § 371, of International Patent Application No. PCT/JP2020/005708, filed on Feb. 14, 2020, which is incorporated by reference herein its entirety.

TECHNICAL FIELD

The present invention relates to a wet pulp material processing machine that can be utilized for the final ink removing process at the time of the recycling of various types of wastepaper such as printed paper, and a process for selectively collecting effective fibers that are included in low concentration wastewater from paper manufacturing.

BACKGROUND ART

When various types of wastepaper such as printed paper are recycled, an ink removing process is carried out by using chemicals. In the case where the paper is processed to such a degree that the ink is almost 100% removed or in the case where the amount of the chemicals is desired to be reduced, an additional washing process by using a vertical concentrating washing machine as that in Patent Literature 1 has been proposed.

Such a vertical concentrating washing machine has been put into practice as an actual machine, where agitating blades and screw blades for transport are arranged inside a rotary drum where a large number of pores have been created in such a manner that kneading washing is carried out so as to discharge a filtrate through the pores of the rotary drum for dewatering when the material to be processed is put in, and the part on the rotary drum side and the part on the blades side are rotated in the opposite directions around the axis.

CITATION LIST

Patent Literature

Patent Literature 1: Japanese Patent No. 3410668

SUMMARY OF THE INVENTION

Technical Problem

In the above-described vertical concentrating washing machine, the rotary drum and the agitating blades are rotated in the opposite direction around the axis, and thus, significant kneading washing effects have been confirmed.

However, the rotary drum and the rotational shaft share the same part where centrifugal force is applied to the upper portion of which the purpose is to transport the material, and thus in Patent Literature 1, pores are created in the upper portion of the rotary drum so that water is jet showered through the pores in order to scrape off the material that has attached to the inner wall of the rotary drum through the effects of the centrifugal force.

The transport path does not provide a configuration with agitating blades, and therefore, a dewatering function by means of centrifugal force is inferior.

In addition, the screw blades are used as a transport means, which prevents the shower water from escaping.

Therefore, the material that is being transported includes the jet showered water. That is to say, the water content in the material that has been dewatered increases during the transport process.

The present invention is provided in view of the above-described conventional problem, and an object thereof is to provide a vertical concentrating washing machine where the above-described defects can be addressed while maintaining the transport function as it is by allowing another member that is provided in place of the screw blades to have the same transport function as that of the screw blades.

Solution to Problem

The present inventor has found as the result of trial-and-error that the above-described defects can be addressed by attaching transport blades in a characteristic shape to the rotational shaft in a specific arrangement in place of the transport screw, and thus, the present invention has been completed.

According to the prior art, there is no way to collect wastewater from paper manufacturing having a low concentration of effective fibers, and such water is turned into sludge from paper manufacturing in a wastewater treatment facility so as to be treated as waste. It has been found that, however, the device according to the present invention particularly provides an improved dewatering function in such a manner that the effective fibers can be concentrated. Accordingly, the device can be used in order to collect effective fibers from wastewater from paper manufacturing as that described above.

Thus, the device according to the present invention automatically provides washing effects and makes it possible to be utilized for the application where the washing effects are not intended as described above, and therefore, the device is denoted as the "wet pulp material processing machine" instead of the "concentrating washing machine" in Patent Literature 1.

In accordance with the first aspect of the present invention, a wet pulp material processing machine is provided with: a porous rotary drum that is rotatable around an axis where the direction of the axis is upward and downward; a rotary shaft that is arranged around the axis of the rotary drum so as to be rotatable around the axis in the direction opposite that of the rotary drum, and to which agitating blades and transport blades are respectively attached to the lower side and to the upper side in such a manner as to protrude outwards within the rotary drum; and a shower water jetting means for jetting shower water from the outside towards the rotary drum, wherein liquid waste originated from a wet pulp material that has been put into the rotary drum is transported upwards by means of the transport blades after being kneaded and washed by the agitating blades, characterized in that a transport blade is in a plate form as viewed in the plane and has a fan-shaped portion that spreads and extends in a fan shape towards the rear side in terms of the direction of rotation, wherein the transport blade is attached to the rotational shaft in such an inclined position that the front side of the plate in terms of the rotational direction is positioned beneath the rear side relative to the axis direction of the rotational shaft, and a plurality of transport blades is attached in a spiral form around the periphery of the rotational shaft with a linear communication portion between each pair of blades in the upward and downward directions.

In accordance with the second aspect of the present invention, the wet pulp material processing machine according to the first aspect is characterized in that the edge of the fan-shaped portion in the direction of the radius on the rear side in terms of the rotational direction is bent so as to be directed downward.

In accordance with the third aspect of the present invention, the wet pulp material processing machine according to the second aspect is characterized in that a transport blade is formed of two members, an attachment part of the rotational shaft and a fan-shaped part that spreads and extends in a fan shape, and the fan-shaped part is formed of a plate that is thinner than the attachment part.

In accordance with the fourth aspect of the present invention, the wet pulp material processing machine according to any of the first through third aspects is characterized in that the transport blades are attached in such a manner that four transport blades cover one round around the rotational shaft.

In accordance with the fifth aspect of the present invention, the wet pulp material processing machine according to any of the first through fourth aspects is characterized in that an agitating blade is in a rectangular plate form as viewed in a plane and is attached to the rotational shaft in an inclined position such that the front side of the plate in the rotational direction is positioned beneath the rear side relative to the direction of the axis of the rotational shaft, and a plurality of agitating blades is attached to the rotational shaft in a spiral form around the periphery of the rotational shaft.

In accordance with the sixth aspect of the present invention, the wet pulp material processing machine according to any of the first through fifth aspects is characterized in that a hole is provided in the attachment portion of an agitating blade on the lower side of the rotational shaft in such a manner that the hole can be used as a hole for supplying the material into the rotary drum.

Advantageous Effects of the Invention

In the wet pulp material processing machine according to the present invention, a plurality of transport blades works together so as to maintain the transport function while shower water can be supplied downward to the agitating blade side.

DESCRIPTION OF EMBODIMENTS

The wet pulp material processing machine A according to an embodiment of the present invention is described in detail in reference to the drawings.

Wet pulp material includes paper at the stage where an ink removing process has already been carried out by means of chemicals, and wastewater from paper manufacturing.

Figure 1:
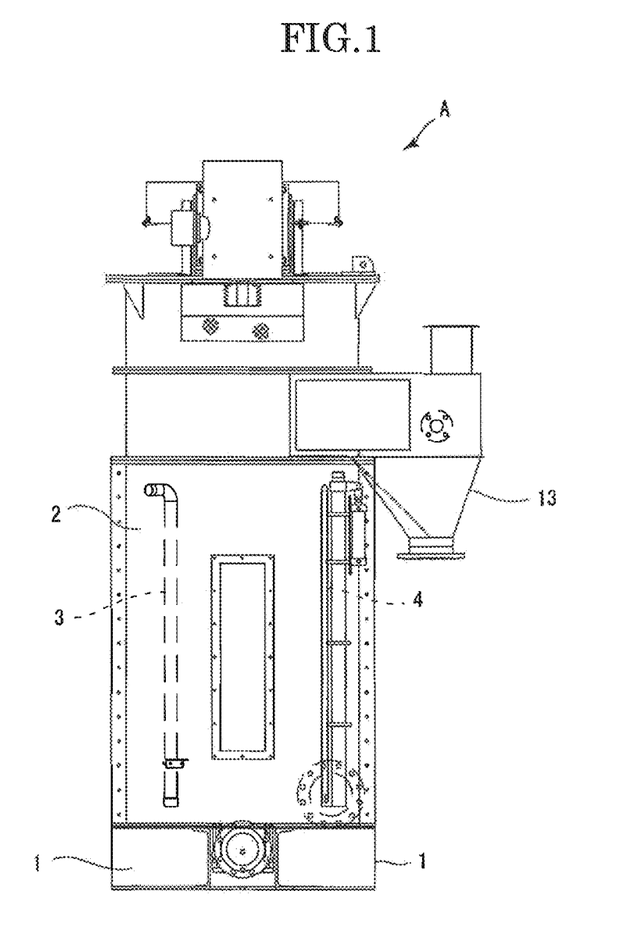
FIG. 1 is a schematic front diagram of the wet pulp material processing machine according to an embodiment of the present invention.
Figure 2:
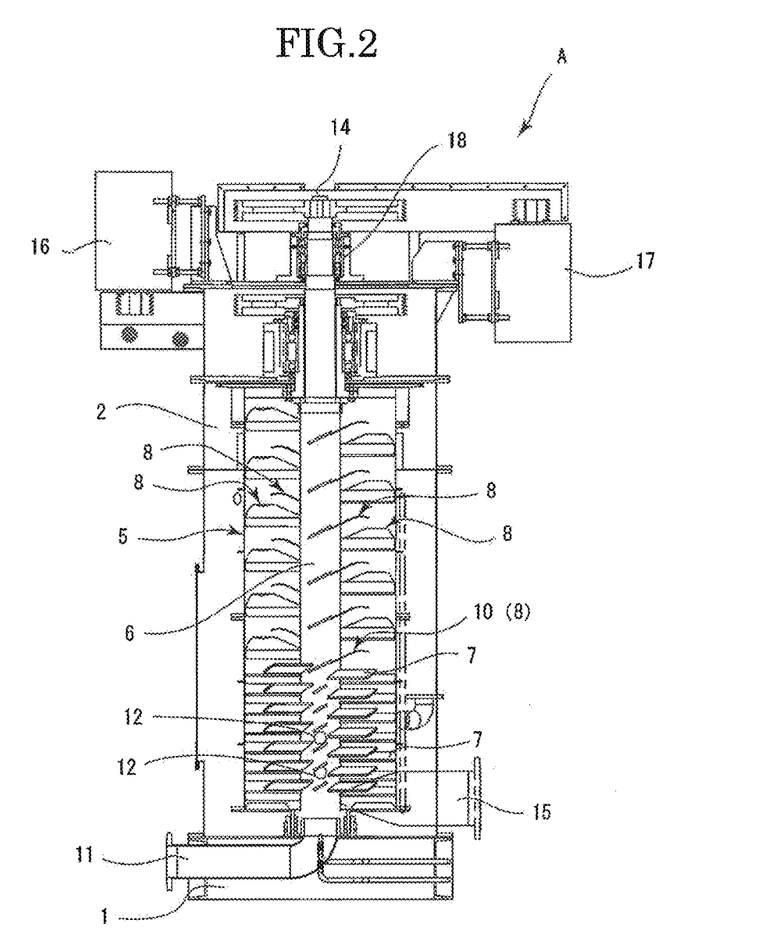
FIG. 2 is a schematic cross-sectional diagram of the wet pulp material processing machine in the back-and-forth directions in FIG. 1.

As shown in FIGS. 1 and 2, the wet pulp material processing machine A is of a vertical type and is placed on top of a base 1. The wet pulp material processing machine A has a cylindrical drum case 2 made of a steel plate such as a stainless-steel plate that stands with the axis direction being upward and downward.

A water supplying pipe 3 stands vertically as a shower water jetting means on the inner periphery side of the cylindrical drum case 2, and a plurality of shower nozzles is arranged along the water supplying pipe 3 in series in the upward and downward directions. All of the shower nozzles are directed towards the center in the axis direction. It is also possible to install a plurality of water supplying pipes 3 at intervals in the peripheral direction. In addition, a water supplying pipe 4 is provided so as to stand vertically as another water jetting means along which a plurality of shower nozzles is arranged in series in the same manner in the upward and downward directions. Here, the water supplying pipe 4 is movable in the upward and downward directions by means of an air cylinder in such a manner that the positions of the shower nozzles slide in the upward and downward directions. As described above, a fixed-type shower is provided on the water supply pipe 3 side, and a slidable-type shower is provided on the water supply pipe 4 side.

It is possible to set the pressure for jetting shower water through the shower nozzles higher than that in the case where the vertical concentrating washing machine in Patent Literature 1 is used because it is not necessary to take into consideration the durability of a metal net, which is not provided in the rotary drum 5 as described below. The pressure is set higher on the water supplying pipe 4 side than the water supplying pipe 3 side.

As indicated by an arrow, a rotary drum (torso part) 5 is provided on the inner side of the water supplying pipes 3 and 4 so as to be rotatable around the axis in the counterclockwise direction. The rotary drum 5 is cylindrical, of which the cross-section is approximately a perfect circle, and is arranged so as to be co-axial with the cylindrical drum case 2. The water supplying pipe 3 faces the rotary drum 5 through almost the total length in the height direction so that water can be jetted to the entire surface of the rotary drum 5 through the shower nozzles. In addition, the water supplying pipe 4 is movable upward and downward over almost the entire length of the rotary drum 5 in the height direction so that water can be jetted to the entire surface of the rotary drum 5 through the shower nozzles.

Figure 3:
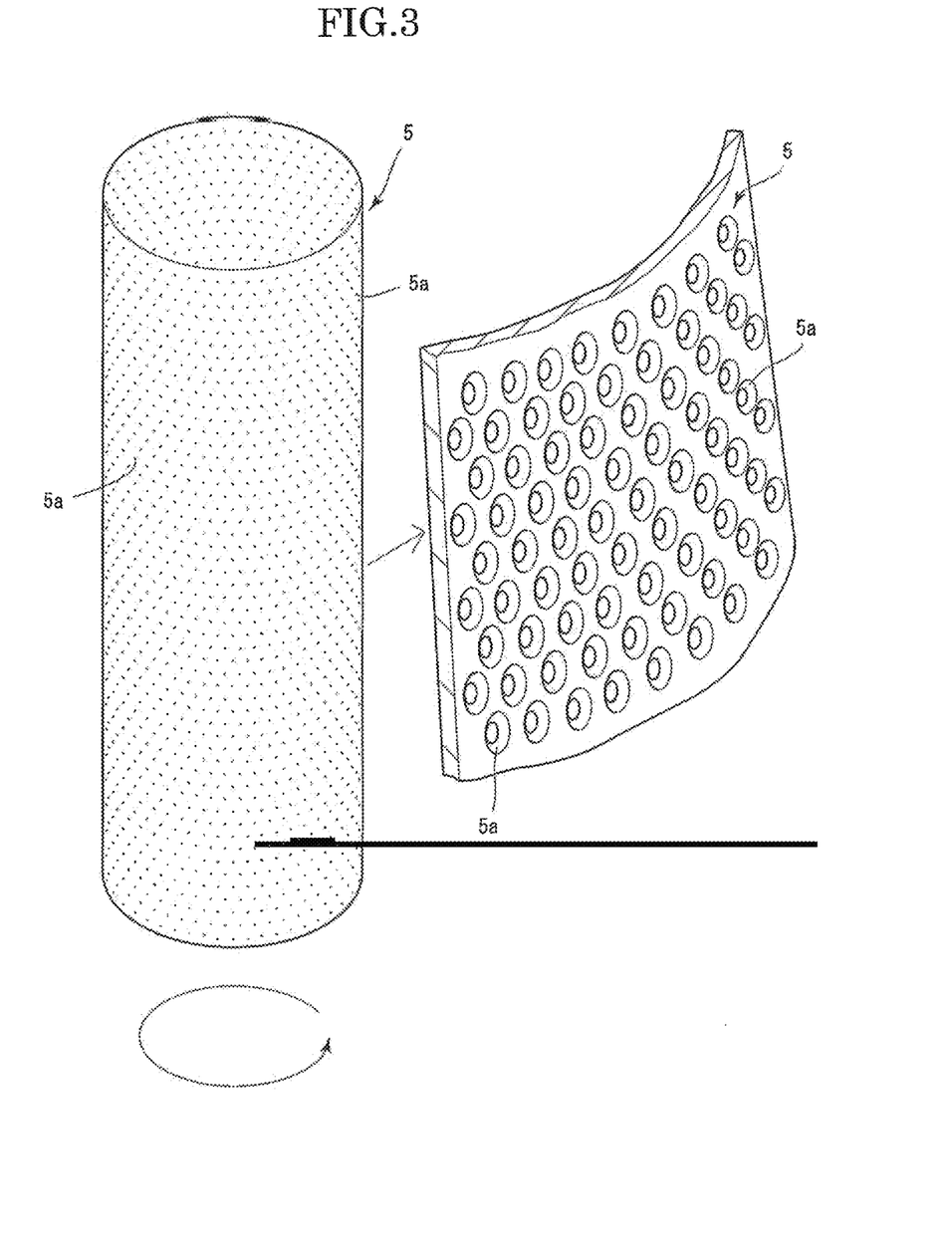
FIG. 3 is a perspective diagram showing in detail the structure of the rotary drum of the wet pulp material processing machine in FIG. 2.

As shown in FIG. 3, the rotary drum 5 is made of stainless steel and punched to be porous. Each of the great number of punched holes 5a is almost a perfect circle in the cross-section at each level, and the diameter thereof expands uniformly from the inside to the outside so as to be tapered in the cross-section along the diameter of the hole. The diameter of each punched hole 5a on the inside and the angle of the taper are set in such a manner that the effective fibers are not moved to the outside of the drum.

A rotational shaft 6 is provided inside the rotary drum 5 in such a state as to stand around the axis. In addition, a plurality of agitating blades 7 is attached to the outer peripheral surface of the rotational shaft 6 on the lower side, and a plurality of transport blades 8 is attached on the upper side.

Both the agitating blades 7, 7, . . . and the transport blades 8, 8, . . . are arranged in a radiating manner with the rotational shaft 6 at the center so as to protrude outward in the direction of the diameter. Both the agitating blades 7 and the transport blades 8 are made of stainless steel.

Figure 4:
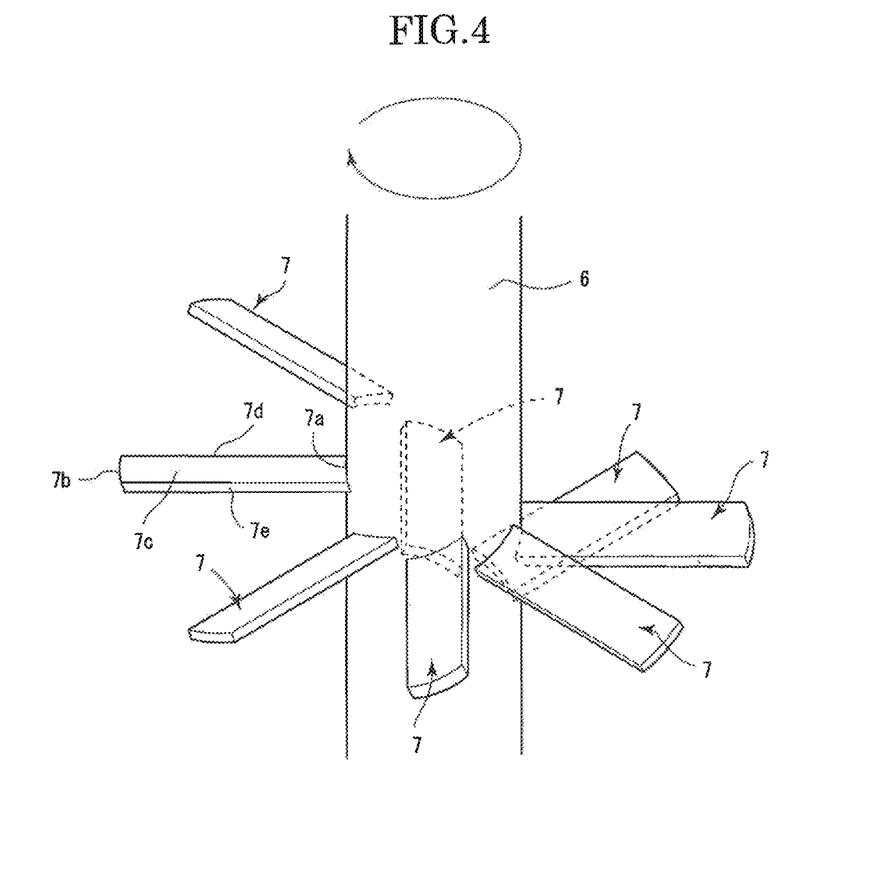
FIG. 4 is a perspective diagram showing the attachment state of the agitating blades in FIG. 2.

Here, FIG. 2 is a conceptual diagram showing the state where a plurality of agitating blades 7 and a plurality of transport blades 8 are arranged within the rotary drum 5, and the shapes and the arrangements of the agitating blades 7 and the transport blades 8 are precisely shown in FIG. 4 and onwards.

As shown in FIG. 4, a plurality of agitating blades 7, 7, . . . forms an agitating means.

Figure 5:
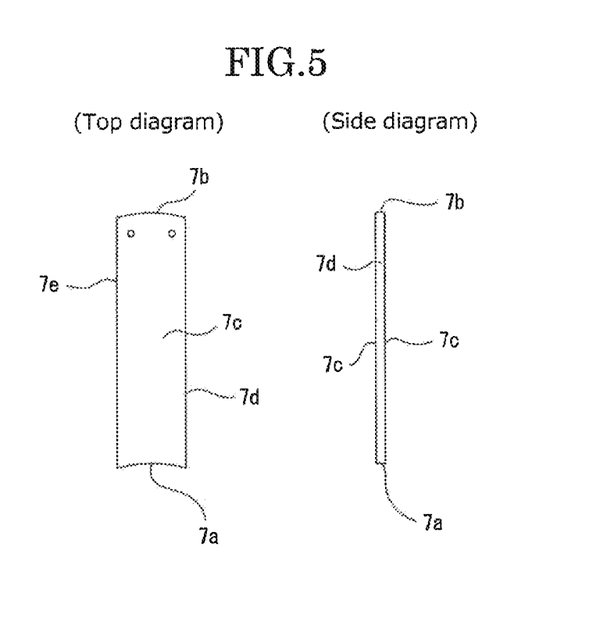
FIG. 5 is a top diagram and a side diagram showing an agitating blade in FIG. 4.

As shown in FIG. 5, an agitating blade 7 is in an approximately rectangular plate form with one short side being in a concave arc. The concave end 7*a* is designed so as to engage with the outer peripheral surface of the attachment portion of the rotational shaft 6, which is a convex surface. In addition, the other short side of the agitating blade 7 is in a convex arc. The convex end 7*b* comes very close to the inner wall surface of the rotary drum 5, and thus has a shape that follows along the concave surface of the rotary drum 5.

The agitating blades 7, 7, . . . are attached to the rotational shaft 6 in a spiral form around the periphery of the rotational shaft 6. The rotational shaft 6 rotates clockwise as indicated by the arrow in the figure, and correspondingly, the agitating blades are attached in a spiral form of which the direction of the spiral is counterclockwise. The agitating blades, 7, 7, . . . are arranged at equal intervals so that eight agitating blades 7 cover one round where the agitating blades 7 that are adjacent in the upward and downward direction are aligned so as to form a column.

An agitating blade 7 is directed in such a direction that the plate surface 7*c* is inclined relative to the axis direction of the rotational shaft 6, that is to say, the upward and downward directions, and the long side 7*d* on the front side in the direction of rotation of the rotational shaft 6 is positioned lower than the long side 7*e* on the rear side in the direction of the rotation.

Figure 6:
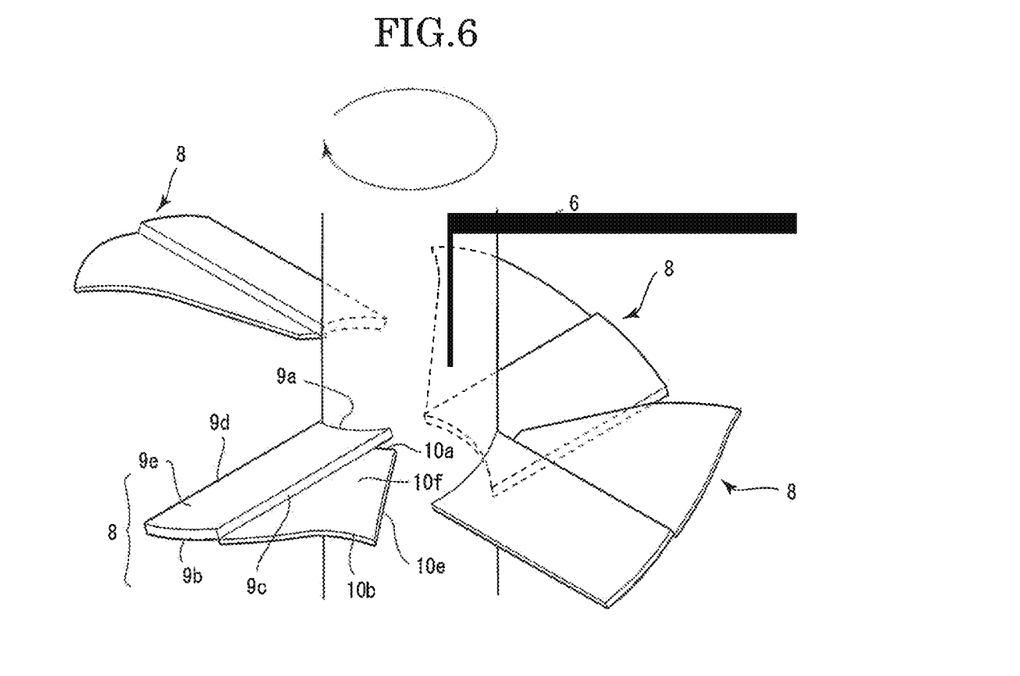
FIG. 6 is a perspective diagram showing the attachment state of the transport blades in FIG. 2.

As shown in FIG. 6, a plurality of transport blades 8, 8, . . . forms a transport means.

Figure 7:
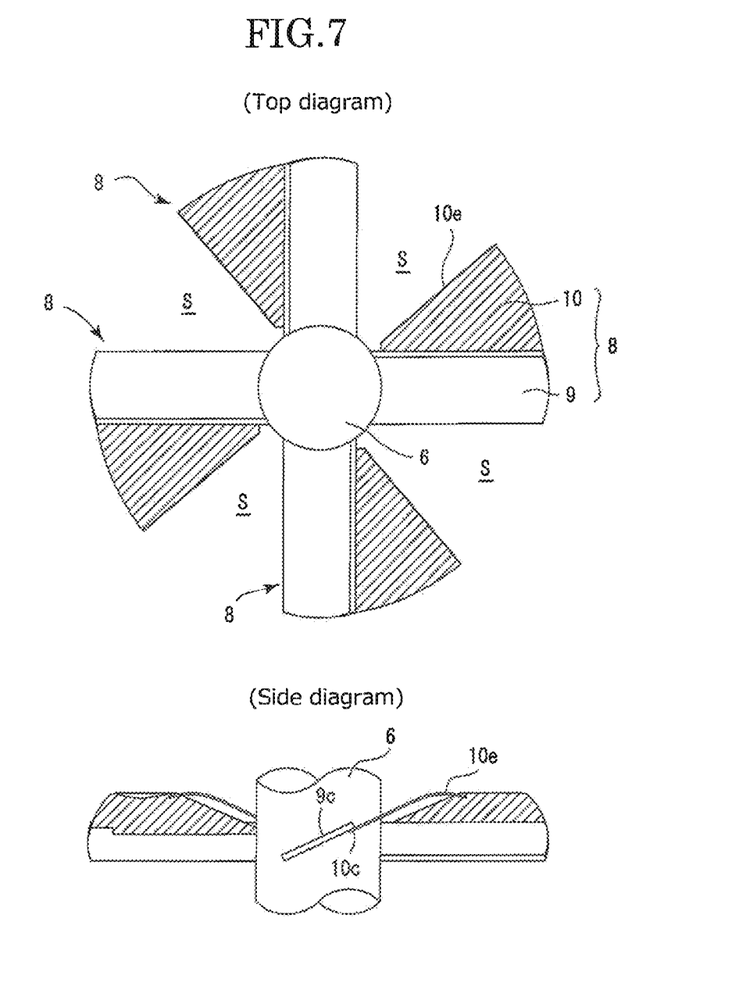
FIG. 7 is a top diagram and a side diagram showing the transport blades in FIG. 6.

As shown in FIG. 7, a transport blade 8 is formed of two plate-like members, and a fan-shaped member 10 is formed of a plate that is thinner than the attachment member 9. The attachment member 9 has approximately the same thickness as the agitating blade 7.

Figure 8:
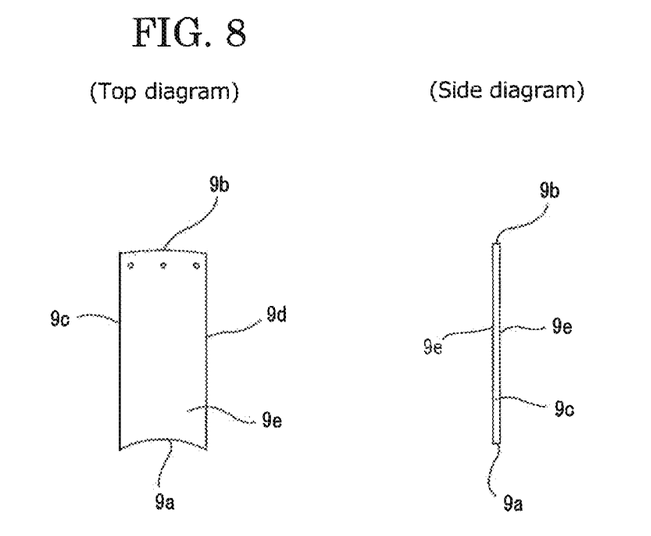
FIG. 8 is a top diagram and a side diagram showing the attachment member of a transport blade in FIG. 7.

As shown in FIG. 8, the attachment member 9 is in an approximately rectangular plate form in the same manner as the agitating blade 7, and one short side is in a concave arc. The concave end 9*a* is designed so as to engage with the outer peripheral surface of the attachment portion of the rotational shaft 6, which is a convex surface. In addition, the other short side is in a convex arc. The convex end 9*b* is very close to the inner wall surface of the rotary drum 5, and thus has a shape that follows along the concave surface of the rotary drum 5.

Here, the width on the short side of the attachment member 9 is greater than the width of the short side of the agitating blade 7.

Figure 9:
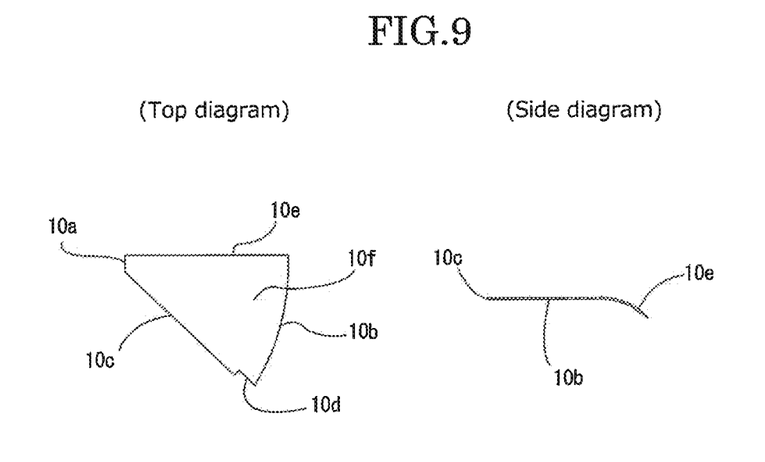
FIG. 9 is a top diagram and a side diagram showing the fan-shaped member of a transport blade in FIG. 7.

As shown in FIG. 9, the fan-shaped member 10 spreads in a fan shape with an edge portion on the pivot side being cut so as to provide a linear base end 10*a*. An arc end 10*b* on the opposite side is designed so as to have approximately the same curvature radius as the convex end 9*b* of the attachment member 9. In addition, a small rectangular notch 10*d* is created in the corner portion between the arc end 10*b* and one end 10*c* in the diameter direction in such a manner that the arc end 10*b* protrudes outward as compared of the end 10*c* in the diameter direction by the length of the notch 10*d*. No notch is created on the other end 10*e* side in the diameter direction.

The end 10*e* in the diameter direction is bent so as to be directed downward. The fan-shaped member 10 is thin, and thus, the process for making this bend is easy.

The end 10*c* in the diameter direction of the fan-shaped member 10 is overlapped on the lower side of one long side 9*c* of the attachment member 9 so as to be welded and connected for integration. That is to say, the end 10*c* in the diameter direction of the fan-shaped member is utilized as a margin for welding.

The entirety of the attachment member 9 is flat, and the fan-shaped member 10 is bent around the end 10*e* in the diameter direction; however, the remaining portion including the overlapping side is flat, and therefore, the above-described connection becomes possible.

The attachment members 9, 9, . . . of the transport blades 8, 8, . . . are attached to the rotational shaft 6 in a spiral form around the periphery of the rotational shaft 6. The rotational shaft 6 rotates clockwise as indicated by the arrow in the figure, and correspondingly, the agitating blades are attached in a spiral form of which the direction of the spiral is counterclockwise. The transport blades, 8, 8, . . . are arranged at equal intervals so that four transport blades 8 cover one round where the transport blades 8 that are adjacent in the upward and downward direction are aligned so as to form a column.

The plate surface (=the plate surface 9*e* of the attachment member 9 and the plate surface 10*f* of the fan-shaped member 10) of a transport plate 8 is directed in the direction that is inclined relative to the axis direction of the rotational shaft 6, that is to say, relative to the upward and downward directions. The plate surface of the transport plate 8 inclines upward as an inclined plane from the long side 9*d* of the attachment member 9 on the front side in the rotational direction to the portion immediately before the end 10*e* in the diameter direction of the fan-shaped member 10 on the rear side in the rotational direction, and furthermore inclines significantly downward around the end 10*e* in the diameter direction due to the bending.

The transport blades 8, 8, . . . are arranged as described above, and thus, there are gaps S between the transport blades 8, 8, . . . as viewed in the plane, and these gaps are linearly connected in the upward and downward directions.

The transport blades 8 are formed as described above so that the material can be transported upwards while being shifted from one transport blade 8 to the adjacent transport blade 8, and thus can move in a spiral form. The way of transport is described in detail below.

The configuration of the remaining portion is described below. As shown in FIG. 2, the border between the rotary drum 5 and the base 1 has a sealed structure where sealing water is used, and the rotary drum 5 is mounted on the receiving portion on the base 1 so as to be rotatable.

The rotational shaft 6 stands and passes through the rotary drum 5 in the direction of the axis of the rotary drum 5 so as to be rotatable. The rotational shaft 6 is in a cylindrical form of which the opening at the lower end is connected with the material supplying pipe 11. The material supplying pipe 11 passes through the side portion of the base 1 so as to extend into the inside and be connected with the rotational shaft 6.

Supply holes 12, 12, . . . are provided in the attachment portions of the transport blades 7, 7, . . . of the rotational shaft 6, and the material that has been fed from the material supplying pipe 11 is discharged and supplied into the rotary drum 5 through the supply holes 12, 12, . . . . Four pairs of supply holes 12 are provided with each pair being aligned in the upward and downward directions and with the four pairs being spaced at 90° in the direction of the diameter. As shown in FIG. 1, the material discharging portion 13 for discharging the material that has been treated is provided in the upper portion.

Here, the opening at the upper end of the rotational shaft 6 is closed with a blank cap 14, and distilling water for adjusting the concentration can be supplied through the blank cap 14 if necessary.

A drainage outlet 15 is provided on the lower side of the drum case 2.

A driving mechanism is equipped on the upper side of the drum case 2.

The driving force from the motor 16 for the rotational shaft is conveyed to the rotational shaft 6 via the belt-and-pulley conveyance mechanism so that the rotational shaft 6 can rotate.

The driving force from the motor 17 for the rotary drum is conveyed to the rotary drum 5 via the belt-and-pulley conveyance mechanism so that the rotary drum 5 can rotate.

As described above, the rotational shaft 6 and the rotary drum 5 are driven independently from each other by different motors. The rotational shaft 6 is supported by the bearing 18 so as to be rotatable relative to the rotary drum 5, and thus, the respective rotations do not interfere with each other.

Next, the contents of treatment during the operation of the wet pulp material processing machine A are described below.

When the wet pulp material processing machine A is operated, the material is discharged and supplied into the inside of the rotary drum 5 that is rotating through the supply holes 12, and thus, the material is kneaded between the rotation of the rotary drum 5 and the counter-rotation of the agitating blades 7 when being thrown to the outside by means of centrifugal force so as to be dewatered. Thus, the material is kneaded and washed with the effects of being dewatered. In particular, the rectangular shape of the agitating blades 7 is effective so as to provide effective agitating effects on the rotational shaft 6 side. In addition, the supply holes 12 are arranged between the agitating blades 7 and 7 that are adjacent to each other in the upward and downward directions, and therefore, the material that has been discharged and supplied through the supply holes 12 immediately receives agitating effects from the agitating blades 7.

Waste liquid is discharged through a great number of punched holes 5a in the rotary drum 5, and thus, the material is thoroughly washed and condensed. Effective fibers are not discharged through the punch holes 5a, and thus, the filtering function is effective.

Accordingly, the system can be positively utilized not only for the cleaning of the material in the case where further ink removing treatment is desired to be carried out, but also for the condensation through dewatering of the material that includes wastewater from paper manufacturing where the concentration is in a wide range.

Part of the material may adhere to the inner wall of the rotary drum 5 due to the effects of centrifugal force; however, shower water under high pressure is jetted inside through the above-described punched holes 5a, thereby scraping off the adhered material.

After that, the material is transported upwards by means of the transport blades 8 so as to be gradually discharged through the material discharging portion 13.

In the wet pulp material processing machine A, as described above, the transport blades 8 play the role of a transport function, and thus exercise characteristic working effects during operation.

In the wet pulp material processing machine A, the agitating means and the transport means share the rotary drum 5 and the rotational shaft 6, and therefore, centrifugal force is applied to the transport means of which the purpose is to transport. Therefore, punched holes 5a are provided in the upper portion of the rotary drum 5 so as to be utilized for jetting shower water.

However, the transport blades 8 themselves are not configured like the agitating blades 7, and therefore, an inferior point can be found in the dewatering function using centrifugal force.

However, there are gaps S between the transport blades 8, 8, . . . as viewed in the plane, and the gaps S are linearly connected in the upward and downward directions. Accordingly, shower water can be dropped through the gaps S to the agitating means side below.

The material that has been placed on top of the plate surface of a transport blade 8 is moved to the adjacent transport blade 8 on the upper side, and the material is transported upwards when such a shifting of the material is repeated. Though the material receives centrifugal force so as to be attracted towards the inner wall side of the rotary drum 5, the transport blades 8 are in a fan shape that spreads towards the inner wall side of the rotary drum 5, and thus, the areas on which the material stably sits and sufficient gaps S are secured with an appropriate balance.

In addition, the end 10e in the direction of the diameter of the fan-shaped member 10 of a transport blade 8 is bent so as to be directed downward, and thus, the excess portion of the material that has shifted onto the fan-shaped member 10 falls off. The amount of transport can be adjusted by changing the degree of this bending, and as a result, the time during which the material stays in the region of the agitating means on the lower side so as to be kneaded, washed, and dewatered can be easily controlled.

In the wet pulp material processing machine A, the agitating effects and the transport effects work in this manner, and therefore, the system is appropriate for collecting effective fibers from the wastewater from paper manufacturing of which the water content is required to be reduced.

Though the embodiment of the present invention is described above in detail, the concrete configuration is not limited to this embodiment, and modifications of the design can be included in the present invention as long as the gist of the invention is not deviated from.

For example, the end 10e in the direction of the diameter of the fan-shaped member 10 is bent so as to be directed downward in the above-described embodiment; however, the entirety, excluding the portion that overlaps the attachment member 9, may be bent so as to be directed downward.

In addition, transport blades 8, 8, . . . that are adjacent in the upward and downward directions are aligned so as to form a column, which is formed of six blades in the above-described embodiment; however, the number thereof is not limited, and an optimal number can be concretely determined taking into consideration the size of the processing machine, the type of material to be treated, and other conditions. Accordingly, in some cases, the number may become eight through eleven, which is greater than six.

REFERENCE SIGNS LIST

1 ... Base
2 ... Cylindrical drum case
3, 4 ... Water supplying pipe for shower water jetting means
5 ... Rotary drum
5a ... Punched hole
6 ... Rotational shaft
7 ... Agitating blade
7a ... Concave end
7b ... Convex end
7c ... Plate surface
7d, 7e ... Long side
8 ... Transport blade
9 ... Attachment member
9a ... Concave end
9b ... Convex end
9c, 9d ... Long side
9e ... Plate surface
10 ... Fan-shaped member
10a ... Pivot end
10b ... Arc end
10c, 10e ... End in the direction of the diameter
10d ... Notch
10f ... Plate surface
11 ... Material supplying pipe
12 ... Supply hole
13 ... Material discharging portion
14 ... Blank cap
15 ... Drainage outlet
16 ... Motor for rotational shaft
17 ... Motor for rotary drum
A ... Wet pulp material processing machine
S ... Gap

The invention claimed is:

1. A wet pulp material processing machine, comprising:
   a porous rotary drum that is rotatable in a first direction around an axis where the direction of the axis is upward and downward;
   a rotary shaft that is arranged around the axis of the porous rotary drum so as to be rotatable around the axis in a second direction opposite that of the porous rotary drum, and to which agitating blades and transport blades are respectively attached to a lower side and to an upper side in such a manner as to protrude outwards within the porous rotary drum; and
   a shower water jet for jetting shower water from outside towards the porous rotary drum, wherein
   the wet pulp material processing machine is configured such that liquid waste originated from a wet pulp material that has been put into the porous rotary drum is transported upwards via the transport blades after being kneaded and washed by the agitating blades,
   the transport blades are in a plate form as viewed in a plane and have a fan-shaped portion that spreads and extends in a fan shape towards a rear side in terms of the second direction of rotation, wherein the transport blades are attached to the rotational shaft in such an inclined position that a front side of the plate in terms of the second rotational direction is positioned beneath the rear side relative to the axis direction of the rotary shaft, and
   a plurality of the transport blades are attached in a spiral form around a periphery of the rotary shaft with a linear communication portion between each pair of blades in the upward and downward directions.

2. The wet pulp material processing machine according to claim 1, wherein
   an edge of the fan-shaped portion in a direction of a radius on the rear side in terms of the second rotational direction is bent so as to be directed downward.

3. The wet pulp material processing machine according to claim 2, wherein
   the transport blades are formed of two members, an attachment part of the rotary shaft and a fan-shaped part that spreads and extends in a fan shape, and
   the fan-shaped part is formed of a plate that is thinner than the attachment part.

4. The wet pulp material processing machine according to claim 1, wherein
   the transport blades are attached such that four transport blades cover one round around the rotary shaft.

5. The wet pulp material processing machine according to claim 1, wherein
   the agitating blades are in a rectangular plate form as viewed in a plane and is attached to the rotary shaft in an inclined position such that the front side of the plate in the second rotational direction is positioned beneath the rear side relative to a direction of the axis of the rotary shaft, and
   a plurality of the agitating blades are attached to the rotary shaft in a spiral form around the periphery of the rotational shaft.

6. The wet pulp material processing machine according to claim 1, wherein
   a hole is provided in the attachment portion of the agitating blades on the lower side of the rotary shaft such that the hole can be used as a hole for supplying the material into the porous rotary drum.

* * * * *